US012697751B2

(12) United States Patent
Ieradi

(10) Patent No.: US 12,697,751 B2
(45) Date of Patent: Aug. 4, 2026

(54) SYSTEMS AND METHODS FOR MANUFACTURING IN-SITU HOLLOW CORE / HOLLOW CORE ANALOGUE SLABS, WALLS, AND COLUMNS

(71) Applicant: Giuseppe Ieradi, Maple (CA)

(72) Inventor: Giuseppe Ieradi, Maple (CA)

(73) Assignee: Giuseppe Ieradi, Maple (CA)

( * ) Notice: Subject to any disclaimer, the term of this patent is extended or adjusted under 35 U.S.C. 154(b) by 450 days.

(21) Appl. No.: 17/554,040

(22) Filed: Dec. 17, 2021

(65) Prior Publication Data

US 2022/0193947 A1 Jun. 23, 2022

Related U.S. Application Data

(60) Provisional application No. 63/126,836, filed on Dec. 17, 2020.

(51) Int. Cl.

| | |
|---|---|
| ***B28B 23/00*** | (2006.01) |
| ***B28B 7/18*** | (2006.01) |
| ***B28B 7/30*** | (2006.01) |
| ***B28B 19/00*** | (2006.01) |
| ***B28B 23/02*** | (2006.01) |

(52) U.S. Cl.

CPC .......... *B28B 23/0068* (2013.01); *B28B 7/186* (2013.01); *B28B 7/306* (2013.01); *B28B 19/003* (2013.01); *B28B 23/02* (2013.01)

(58) Field of Classification Search

CPC ..... B28B 23/0068; B28B 23/02; B28B 7/306; B28B 7/186; B28B 1/14; B28B 7/28; B28B 7/30; B28B 7/303; B28B 7/32; B28B 23/0006; B29B 1/30

See application file for complete search history.

(56) References Cited

U.S. PATENT DOCUMENTS

| | | | | | |
|---|---|---|---|---|---|
| 919,687 | A * | 4/1909 | Bowen | E04G 11/34 | 425/62 |
| 1,021,443 | A * | 3/1912 | Barone | E01D 21/00 | 249/34 |
| 1,391,352 | A * | 9/1921 | Ward | E04B 2/52 | 52/441 |
| 2,261,247 | A * | 11/1941 | Girard | B28B 7/306 | 264/DIG. 73 |
| 2,315,634 | A * | 4/1943 | Mccall | B28B 7/30 | 52/223.6 |
| 4,141,946 | A * | 2/1979 | Rauenhorst | E04B 5/043 | 264/DIG. 57 |
| 4,229,497 | A * | 10/1980 | Piazza | B32B 13/12 | 264/257 |
| 9,308,670 | B1 * | 4/2016 | Cubeta | B29C 70/70 | |
| 2004/0088940 | A1 * | 5/2004 | LeJeune | B28B 23/0056 | 52/511 |
| 2010/0107536 | A1 * | 5/2010 | Tautari | E04B 1/14 | 52/414 |

(Continued)

*Primary Examiner* — Jeffrey M Wollschlager

(74) *Attorney, Agent, or Firm* — Norton Rose Fulbright Canada LLP

(57) ABSTRACT

A use of at least one form insert for in-situ manufacture of a hollow core or hollow core analogue slab, the at least one form insert positioned in a mould defining a monolithic volume in which the hollow core or hollow core analogue slab is manufactured by pouring a cement-based curable material into the monolithic volume to submerge the at least one form insert.

17 Claims, 15 Drawing Sheets

(56) References Cited

U.S. PATENT DOCUMENTS

| | | | | |
|---|---|---|---|---|
| 2010/0189953 | A1* | 7/2010 | Lim | E04D 11/00 428/140 |
| 2013/0047530 | A1* | 2/2013 | Durham | B28B 7/186 52/576 |
| 2014/0183776 | A1* | 7/2014 | Jardine | B28B 7/0032 425/468 |
| 2015/0030815 | A1* | 1/2015 | Chervonobaba | E04C 2/06 428/188 |

* cited by examiner

SYSTEMS AND METHODS FOR MANUFACTURING IN-SITU HOLLOW CORE / HOLLOW CORE ANALOGUE SLABS, WALLS, AND COLUMNS

CROSS REFERENCE TO RELATED APPLICATION AND CLAIM OF PRIORITY

The present application claims priority to U.S. provisional patent application No. 63/126,836 filed on Dec. 17, 2020, the entire contents of which are hereby incorporated by reference.

TECHNICAL FIELD

Embodiments of the present disclosure generally relate to the field of construction, and more specifically, embodiments relate to hollow core slabs, walls, or columns.

BACKGROUND OF THE ART

Concrete is often used as a building material. Concrete is quite heavy and some of its support capacity is used to hold its own weight. Construction companies sometimes rely on prefabricated hollow core panels. This may be done to reduce the project completion time and to reduce the cost of the project by reducing the amount of concrete required for certain building projects. Hollow core slabs are manufactured with voids within the slabs that reduce the weight and the amount of raw material needed to manufacture them.

These hollow core slabs are generally manufactured by extrusion offsite. Their manufacture requires that raw materials be transported to a manufacturing site and the slabs transported to the construction site. This transport generates greater expenses and more pollution from the construction project.

Furthermore, these prefabricated hollow core slabs often come in factory standard sizes that need to be adapted to the project's construction needs. Even where bespoke slabs are generated, they will still require transport which logistically limits the size and proportions of any such slabs.

SUMMARY

Construction methods and ideology have changed little in the last 100 years. The most notable increase has been an increase in building height. Worldwide, the current building systems are not sustainable, especially when considering the world's growing population. Buildings use many finite resources with relatively short lifespans (e.g., steel, copper, wood, and concrete). Building materials are not often fabricated from recycled materials. The transport of raw materials long distances can emit unnecessary carbon dioxide and other pollutants. Buildings are sometimes only hours away from losing all of their heat or ventilation should there be a power outage.

Urban developments have limited provisions for emergencies. Buildings of today emit a large amount of carbon dioxide. The construction industry needs solutions tailored to creating sustainable, affordable, and self-sufficient buildings. Such 'green' buildings can help reduce the material cost and carbon dioxide pollution arising from construction which can in turn provide a more sustainable future. Embodiments of the devices, systems, and methods described herein may help create these 'green' buildings. Embodiments described herein can also find use in other construction projects for the reasons described herein.

Concrete is often used as a building material. Concrete is quite heavy and some of its support capacity is used to hold its own weight. Construction companies sometimes rely on prefabricated hollow core panels. Hollow core concrete slabs may be used increase the speed with which the construction is completed and to reduce the cost of the project by reducing the amount of concrete required for certain building projects. These slabs are generally manufactured offsite and transported to the construction site generating unnecessary pollution and additional transportation costs.

The devices, systems, and methods described herein are directed at the in-situ manufacture of hollow core or hollow core analogue concrete slabs, walls, or columns. In some aspects, these devices, systems, and methods can permit the transport of raw materials (e.g., concrete) directly to a construction site to make the slabs as needed. This can reduce the cost of transportation and can reduce the production per ton of pollution generated by concrete components of a building.

These devices, systems, and methods can exhibit the advantages of hollow core design (e.g., reduced material needs and structure weight) and can exhibit some of the simplicity of onsite manufacturing (e.g., bespoke design and less transportation). The hollow core design can also provide a viable means of recycling materials that might otherwise be sent to a landfill (e.g., Styrofoam).

In one aspect, a use of at least one form insert for in-situ manufacture of a hollow core or hollow core analogue slab, the at least one form insert positioned in a mould defining a monolithic volume in which the hollow core or hollow core analogue slab is manufactured by pouring a cement-based curable material into the monolithic volume to submerge the at least one form insert.

In some embodiments, at least one structural element of a building defines at least one outer edge of a mould.

In some embodiments, the at least one form insert is positioned in the mould with at least one support.

In some embodiments, the at least one support is at least one chair.

In some embodiments, the at least one form insert comprises a rigid structure having a generally cylindrical shape that defines an interface between the at least one insert and the cement-based curable material.

In some embodiments, the at least one form insert is collapsible to separate the at least one form insert from the cement-based curable material when said cement-based curable material has cured.

In some embodiments, the at least one form insert comprises a resilient inflatable material, a rigid structure when inflated having a generally cylindrical shape that defines an interface between the at least one form insert and the cement-based curable material, and the at least one form insert is deflatable to separate the at least one form insert from the cement-based curable material when said cement-based curable material has cured.

In another aspect, a system for in-situ manufacturing a hollow core or hollow core analogue slab comprising: a cement-based curable material, a mould defining a monolithic volume to receive the cement-based curable material, and at least one form insert. The at least one form insert configured to extend through the monolithic volume. The at least one form insert comprising a rigid structure having a generally cylindrical shape configured to define an interface between the at least one form insert and the cement-based curable material when the cement-based curable material is received in the mould. The at least one form insert is less dense than the cured material. At least one support for positioning the at least one form insert in the monolithic volume. When the cement-based curable material is received by the mould, the cement-based curable material defines the at least one form insert and cures to form the hollow core or hollow core analogue slab.

In some embodiments, the at least one support is at least one chair.

Some embodiments further comprising a first plurality of reinforcing bars configured to extend through the monolithic volume along a plane substantially parallel to a bottom of the mould and a second plurality of reinforcing bars configured to extend through the monolithic volume along a plane substantially parallel to and above the first plurality of reinforcing bars.

In some embodiments, the first or second plurality of reinforcing bars is configured to extend in a direction substantially parallel to the direction of the at least one form insert.

In some embodiments, the at least one form insert is configured to extend along a plane between the planes of the first and second pluralities of reinforcing bars.

In another aspect, a method of manufacturing a hollow core or hollow core analogue slab in-situ comprising: providing a mould to receive at least one form insert, the mould defining a monolithic volume, and the mould positioned at an in-situ desired location of the hollow core or hollow core analogue slab, positioning the at least one form insert within the monolithic volume, supporting the at least one form insert in a fixed position within the monolithic volume, pouring a cement-based curable material to fill the monolithic volume, and curing the cement-based curable material.

In some embodiments, the at least one form insert comprises a rigid structure having a generally cylindrical shape that defines an interface between the insert and the cement-based curable material.

In some embodiments, the at least one form insert comprises a resilient inflatable material and a rigid structure when inflated having a generally cylindrical shape that defines an interface between the at least one form insert and the cement-based curable material. The method further comprising, inflating the at least one form insert before positioning the at least one form insert, deflating the at least one form insert after curing the cement-based curable material, and removing the at least one form insert.

Some embodiments further comprising removing the at least one form insert from the cement-based curable material when said cement-based curable material has cured.

Some embodiments further comprising, before pouring the cement-based curable material, positioning a first plurality of reinforcing bars to extend through the monolithic volume along a plane substantially parallel to the bottom of the mould and positioning a second plurality of reinforcing bars to extend through the monolithic volume along a plane substantially parallel to and above the first plurality of reinforcing bars.

Some embodiments further comprising positioning the first or second plurality of reinforcing bars to extend in a direction substantially parallel to the at least one form insert.

Some embodiments further comprising: positioning the at least one form insert is extend along a plane between the planes of the first and second plurality of reinforcing bars.

In some embodiments the at least one form insert is made with Styrofoam, cardboard, wax, paper, plastic, hemp sock, Tyvec, polyurethane, rubber, wood, or PVC.

Many further features and combinations thereof concerning the present improvements will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1A:
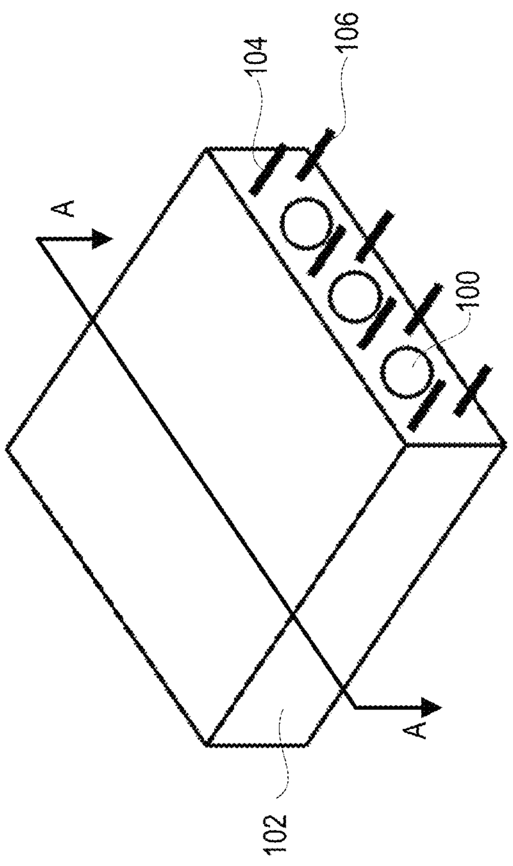
FIG. 1A is an isometric view of a completed hollow core or hollow core analogue floor slab and FIG. 1B is a frontal cross-section view along the line A-A of the completed hollow core or hollow core analogue slab illustrated in FIG. 1A, according to some embodiments.

Construction methods and ideology have changed little in the last 100 years. The most notable increase has been an increase in building height. Worldwide, the current building systems are not sustainable, especially when considering the world's growing population. Buildings use many finite resources with relatively short lifespans (e.g., steel, copper, wood, and concrete). Building materials are not often fabricated from recycled materials. The transport of raw materials long distances can emit unnecessary carbon dioxide and other pollutants. Buildings are sometimes only hours away from losing all of their heat or ventilation should there be a power outage.

Urban developments have limited provisions for emergencies. Buildings of today emit a large amount of carbon dioxide. The construction industry needs solutions tailored to creating sustainable, affordable, and self-sufficient buildings. Such 'green' buildings can help reduce the material cost and carbon dioxide pollution arising from construction which can in turn provide a more sustainable future. Embodiments of the devices, systems, and methods described herein are intended to act as just one step towards these 'green' buildings. Embodiments described herein can also find use in other construction projects for the reasons described herein.

Concrete is often used as a building material. Concrete is quite heavy and some of its support capacity is used to hold its own weight. Construction companies sometimes rely on prefabricated hollow core panels. This is done to reduce the project completion time and to reduce the cost of the project by reducing the amount of concrete required for certain building projects. These slabs are generally manufactured offsite and transported to the construction site generating unnecessary pollution and additional transportation costs.

The devices, systems, and methods described herein are directed at the in-situ manufacture of hollow core or hollow core analogue concrete slabs, walls, or columns. In some aspects, these devices, systems, and methods can permit the transport of raw materials (e.g., concrete) directly to a construction site to make the slabs as needed. This can reduce the cost of transportation and can reduce production per ton of pollution generated by concrete components of a building.

These devices, systems, and methods can exhibit the advantages of hollow core design (e.g., reduced material needs and structure weight) and can exhibit some of the simplicity of onsite manufacturing (e.g., bespoke design and less transportation). The hollow core design can also provide a viable means of recycling materials that might otherwise be sent to a landfill (e.g., Styrofoam).

Some embodiments can reduce emissions of carbon dioxide and other pollutants arising from concrete manufacturing by reducing the amount of material required in the fabrication of concrete slabs using hollow cores or hollow core analogues. Some embodiments can reduce the size of footings and columns required in the construction of a building thereby reducing the amount of materials and required for the fabrication of the other structural features of the building.

Although terms such as "maximize", "minimize" and "optimize" may be used in the present disclosure, it should be understood that such term may be used to refer to improvements, tuning and refinements which may not be strictly limited to maximal, minimal or optimal.

The term "connected" or "coupled to" may include both direct coupling (in which two elements that are coupled to each other contact each other) and indirect coupling (in which at least one additional element is located between the two elements).

The term "substantially" as used herein may be applied to modify any quantitative representation which could permissibly vary without resulting in a change in the basic function to which it is related.

The term "in-situ" as used herein to refer to the devices, methods, and systems or manufacturing or using a hollow core or hollow core analogue slab system refers to devices, methods, and systems that are deployed at a construction site of a building as opposed to a manufacturing facility.

The term "slab" as used herein may refer to a slab used in the construction of a floor, wall, or column component of a structure. In floors, at least one form insert can be configured to extend in a direction substantially parallel to the top of the floor. In walls, at least one form insert can be configured to extend in a direction substantially parallel, or perpendicular, to the ground and a surface of the wall. In columns, at least one form insert can be configured to extend in a direction substantially parallel to the column.

In columns, references to 'bottom', 'top', 'above', and 'below' refer to the up and down directionality of the column viewed along an axial cross-section of the at least one form of the column.

The term "mould" as used herein refers to structure defining a monolithic volume, the structure defining the final intended position of a hollow core or hollow core analogue slab. A mould is not limited to single unitary structure; rather it may comprise multiple elements, for example, a mould can be defined by temporary structural elements (e.g. wood boards) erected for the purpose of making a hollow core or hollow core analogue slab, and/or structural features of the building (e.g. walls, floors). The mould may be an open mould allowing liquid concrete to be poured into the mould and be exposed to air.

Aspects of various embodiments are described through reference to the drawings.

Figure 1B:
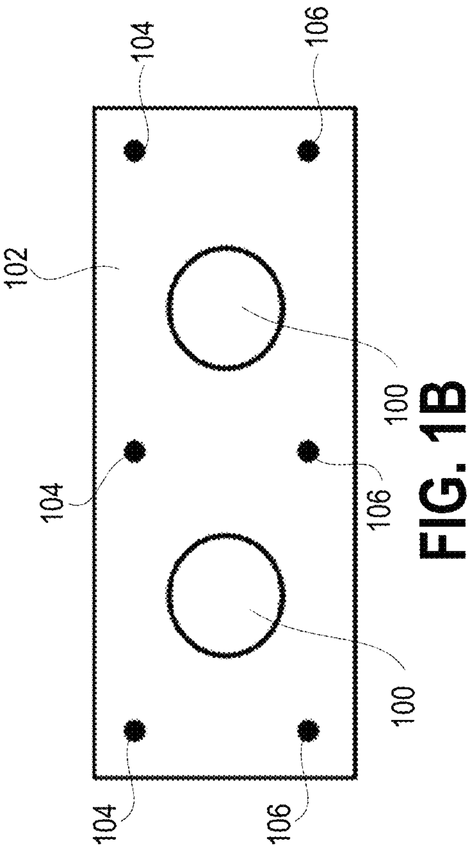

FIG. 1A is an isometric view of a completed hollow core or hollow core analogue floor slab and FIG. 1B is a frontal cross-section view along the line A-A of the completed hollow core or hollow core analogue slab illustrated in FIG. 1A, according to some embodiments. One skilled in the art will recognize that the dimensions of slab 102 (and in particular the spacing between cavities 100) can be based, in part, on the demands of the building project (e.g., the load requirements, span of the slab, load conditions, site specifications, wind load, etc.). Slab 102 comprises a cement-based curable material that has been cured. In an example, a weight of a 10" solid concrete slab may be about 140 lbs per square foot whereas a hollow core slab may be about 75 to 85 lbs per square foot. In an example, a typical slab can be 10" tall. Slab 102 can define cavities 100 within slab 100. Cavities 100 can be hollowed space, i.e. generally empty, which can make slab 102 a hollow core slab. Alternatively, cavities 100 can comprise form inserts which can make slab 102 a hollow core analogue slab.

Pluralities of reinforcing bars 104 and 106 can be configured to extend through the slab. In an example, the pluralities of reinforcing bars 104 and 106 can comprise steel, carbon fiber, fiberglass, or any suitable reinforcing material. Pluralities of reinforcing bars 104 and 106 can comprise bars configured to extend orthogonal or parallel to cavities 100 or both. The span and load specifications for the slab can be used to determine the size, spacing, and directionality of the reinforcing bars. For example, pre-stressed steel cables acting as pluralities of reinforcing bars 104 and 106 may be preferentially be configured to extend in a direction parallel to cavities 100. In other examples, where fiberglass acts as the pluralities of reinforcing bars 104 and 106, pluralities of reinforcing bars 104 and 106 may be preferentially configured to extend in directions both parallel and orthogonal to cavities 100.

Cavities 100 can be generally spaced equally distanced throughout slab 102. In some embodiments, the spacing between cavities 100 can be between 1" and 4". In some embodiments the spacing between cavities 100 is 3". In some embodiments, cavities 100 are embedded between 1" and 3" below the top of the slab or above the bottom of the slab. In some embodiments, cavities 100 are embedded 2" below the top or above the bottom of the slab. In some embodiments, cavities 100 are cylindrical with radii between 1" and 8". In some embodiments, cavities 100 are cylindrical with radii of 5". In some embodiments, plurality of reinforcing bars 104 is embedded 0.5" to 2" below the top of the slab. In some embodiments, plurality of reinforcing bars 104 is embedded 1" below the top of the slab. In some embodiments, plurality of reinforcing bars 106 is embedded 0.5" to 2" above the bottom of the slab. In some embodiments, plurality of reinforcing bars 106 is embedded 1" above the bottom of the slab.

Hollow core slabs such as those illustrated in FIG. 1A can be produced in-situ by the devices, systems, and methods described herein. In some embodiments where cavities 100 comprise form inserts, these inserts can be less dense than the cured cement-based curable material. In some embodiments where cavities 100 comprise form inserts, these form inserts will themselves comprise hollow cores the surface of which can be defined by the interface between form insert and concrete having a rigid structure that can support the concrete.

In some embodiments where cavities 100 comprise nothing, the form insert used in the manufacture of slab 102 can be made of a material which does not bind with the cured cement-based curable material. In some embodiments, the form insert used can be collapsed within the slab to facilitate removal of the form insert. In some embodiments, the form insert used can be inflated to generate a rigid structure while slab 102 is manufactured in-situ and deflated and removed after manufacturing is complete. In some embodiments, removable form inserts are reusable in the manufacture of subsequent slabs.

Cavities 100, as illustrated, have a generally circular frontal cross-section and extend in the transverse direction (i.e., cylindrical). In other embodiments, the frontal cross-section of cavities 100 can be generally square or another shape and extend in the transverse direction. When the term cylindrical is used throughout this description, it is understood to mean a frontal cross-section of generally of a shape (e.g., circle, square, triangle, rectangle, etc.) that extends in the transverse direction.

In some embodiments, manufacturing slab 102 in-situ allows for greater insulation between slab 102 and any adjacent walls. The concrete can effectively bind to the adjacent wall which can increase any insulation provided by slab 102.

Figure 1D:
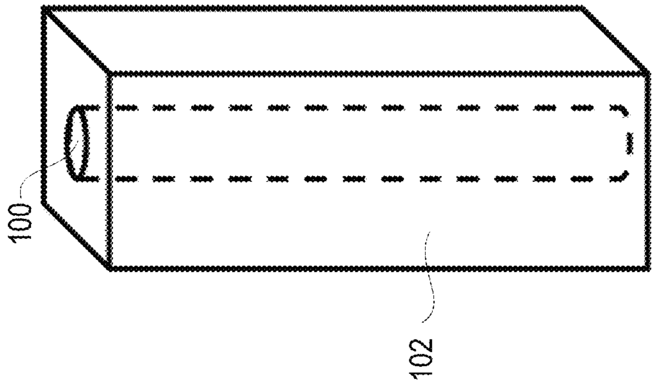
FIG. 1D is an isometric view of a completed hollow core or hollow core analogue column slab.
Figure 1C:
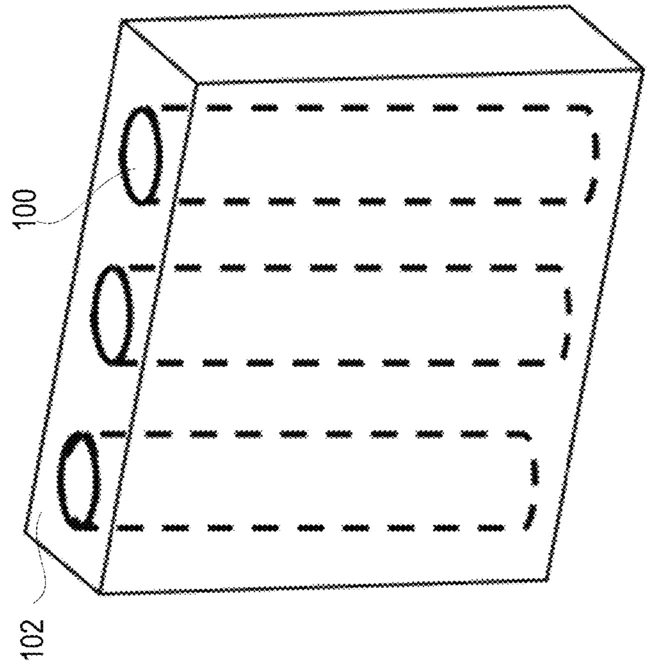
FIG. 1C is an isometric view of a completed hollow core or hollow core analogue wall slab.

FIG. 1C is an isometric view of a completed hollow core, or hollow core analogue wall slab, illustrating the internal hollow core or internal form insert in dashed lines.

FIG. 1D is an isometric view of a completed hollow core or hollow core analogue column slab, illustrating the internal hollow core or internal form insert in dashed lines.

Figure 2A:
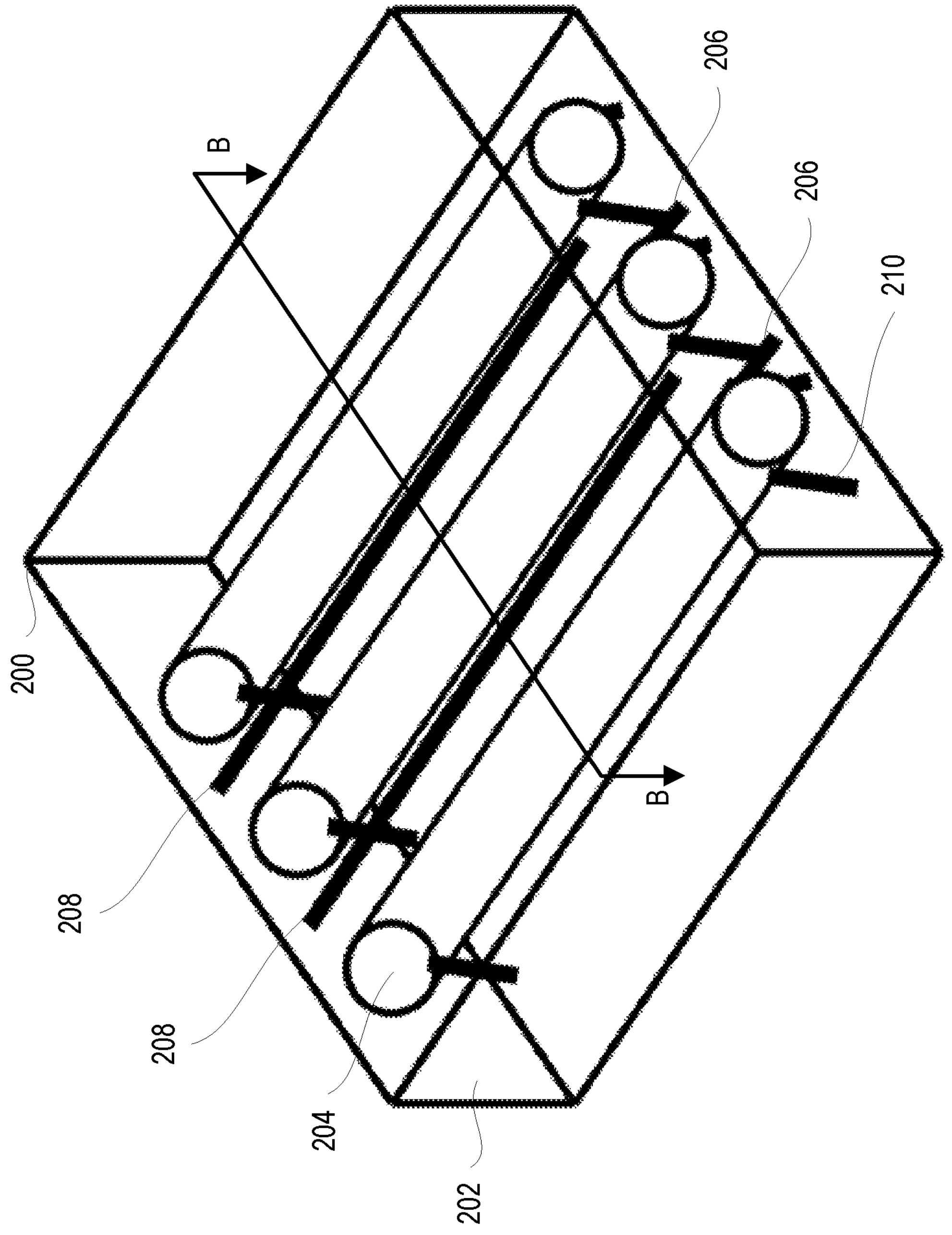
FIG. 2A and FIG. 2B are isometric views of example hollow core or hollow core analogue slabs illustrating internal reinforcing bars and form inserts, according to some embodiments.
Figure 2B:
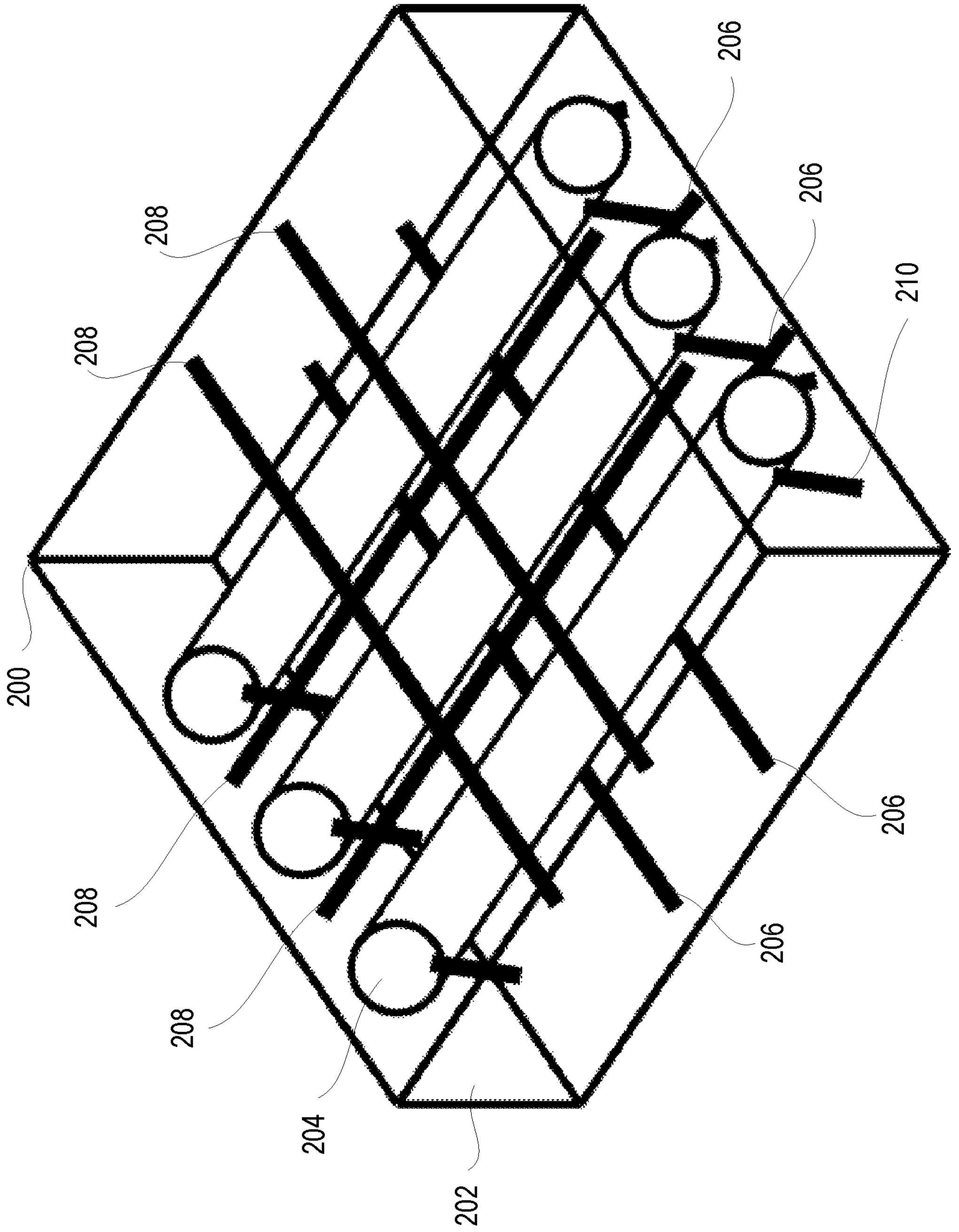

FIG. 2A and FIG. 2B are isometric views of example hollow core or hollow core analogue slabs illustrating internal reinforcing bars and form inserts, according to some embodiments. Mould 200 defines a monolithic volume. Mould 200 can be defined by the final intended position of the hollow core or hollow core analogue slab. The monolithic volume receives at least one form insert 204. At least one form insert 204 can be configured to extend through the monolithic volume. At least one form insert 204 can be held in place using support 210. The monolithic volume can optionally receive pluralities of reinforcing bars 206 and 208. Cement-based curable material 202 is poured to fill the monolithic volume. Cement-based curable material 202 is left to cure forming the hollow core/hollow core analogue slab.

In one aspect, FIG. 2A illustrates a use of at least one form insert 204 for in-situ manufacture of a hollow core or hollow core analogue slab, at least one form insert 204 positioned in mould 200 defining a monolithic volume in which the hollow core or hollow core analogue slab is manufactured by pouring cement-based curable material 202 into the monolithic volume to submerge at least one form insert 204.

In some embodiments, at least one structural element of a building defines at least one outer edge of mould 200. Structural elements of a building (e.g., walls, columns, etc.) can define mould 200. The hollow core/hollow core analogue slab can be manufactured in the slab's final intended position. This can eliminate the transportation required to bring a manufactured-offsite slab onsite.

In some embodiments, temporary boundaries (e.g., plywood) are erected to partly define mould 200. These temporary boundaries can be held in place by scaffolding. The temporary boundaries are erected for the manufacture of the hollow core/hollow core analogue and can be removed once cement-based curable material 202 has cured. In some embodiments, the temporary boundaries can be reused in the manufacture of subsequent hollow core/hollow core analogue slabs. In some embodiments, the temporary boundaries can be implemented in the form of a fly-table/form-table that can provide a temporary boundary for the manufacture of a floor slab and can be subsequently moved with minimal disassembly to act as a temporary boundary for another floor slab.

In some embodiments, at least one form insert 204 comprises a rigid structure having a generally cylindrical shape that defines an interface between the at least one insert and the cement-based curable material. In some embodiments, at least one form insert 204 comprises a generally circular or square frontal cross-section and is configured to extend in its transverse direction.

In some embodiments, at least one form insert 204 is positioned in mould 200 with at least one support 210. At least one support 210 can hold at least one form insert 204 in position while cement-based curable material 202 cures. In some embodiments, at least one support 210 is at least one chair.

In some embodiments, at least one form insert 204 can be removed from the cement-based curable material 202 when cement-based curable material 202 has cured. In some embodiments, form insert 204 is positioned within a flexible sleeve within mould 200. The flexible sleeve can be configured to resist binding with cement-based curable material 202 as cement-based curable material 202 cures. The flexible sleeve permits form insert 204 to be removed from the slab once it has cured. In some further embodiments, the flexible sleeve can also be removed from the slab.

In some embodiments, at least one form insert 204 is collapsible to separate at least one form insert 204 from cement-based curable material 202 when cement-based curable material 202 has cured. The cavity left by the removal of at least one form insert 204 can create a hollow core in the slab.

In some embodiments, at least one form insert 204 comprises a resilient inflatable material, a rigid structure when inflated having a generally cylindrical shape that defines an interface between at least one form insert 204 and cement-based curable material 202, and at least one form insert 204 is deflatable to separate at least one form insert 204 from cement-based curable material 202 when cement-based curable material 202 has cured. The resultant cavity left by the removal of at least one form insert 204 forms at least one hollow core in the slab. In such an embodiment, at least one form insert 204 is configured to inflate using a fluid. At least one form insert 204 can be optionally reused to manufacture another hollow core slab.

In another aspect, FIG. 2A illustrates a system for in-situ manufacturing a hollow core or hollow core analogue slab comprising cement-based curable material 202, mould 200 defining a monolithic volume to receive cement-based curable material 202 and at least one form insert 204. At least one form insert 204 configured to extend through the monolithic volume. At least one form insert 204 comprising a rigid structure having a generally cylindrical shape configured to define an interface between at least one form insert 204 and cement-based curable material 202 when cement-based curable material 202 is received in mould 200. At least one form insert 204 is less dense than cured cement-based curable material 202. At least one support 210 for positioning at least one form insert 204 in the monolithic volume. When cement-based curable material 202 is received by mould 200, cement-based curable material 202 defines at least one form insert 204 and cures to form the hollow core or hollow core analogue slab.

Some embodiments further comprising a first plurality of reinforcing bars 206 configured to extend through the monolithic volume along a plane substantially parallel to a bottom of mould 200 and a second plurality of reinforcing bars 208 configured to extend through the monolithic volume along a plane substantially parallel to and above first plurality of reinforcing bars 206.

In some embodiments, at least one support 210 is at least one chair. In some embodiments, the at least one chair is positioned within cement-based curable material 202. In some embodiments, the at least one chair is configured to support a plurality of reinforcing bars 206 or 208.

In some embodiments, the first or second plurality of reinforcing bars 206 or 208 is configured to extend in a direction substantially orthogonal to the direction of at least one form insert 204. As illustrated in FIG. 2A, in some embodiments, the first or second plurality of reinforcing bars 206 or 208 is configured to extend in a direction substantially parallel to the direction of at least one form insert 204. As illustrated in FIG. 2B, in some embodiments, the first or second plurality of reinforcing bars 206 or 208 is configured to have some reinforcing bars extend in a direction substantially parallel to the direction of at least one form insert 204 and some reinforcing bars extend in a direction substantially orthogonal to the direction of at least one form insert 204.

In some embodiments, cement-based curable material 202 is concrete.

In some embodiments, at least one form insert 204 is configured to extend along a plane between the planes of the first and second pluralities of reinforcing bars 206 and 208.

Figure 3:
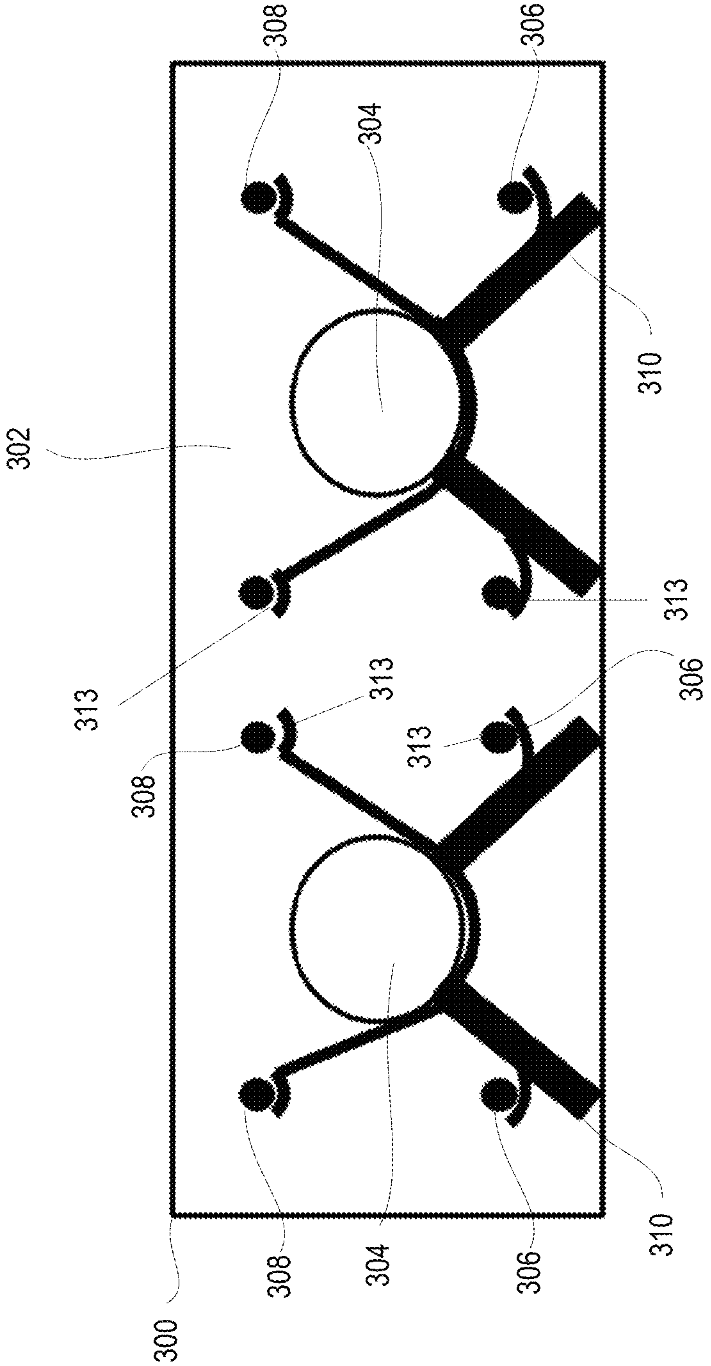
FIG. 3 is a frontal cross-section of the hollow core or hollow core analogue slab of FIG. 2A illustrated along the line B-B, according to some embodiments.

FIG. 3 is a frontal cross-section of the hollow core or hollow core analogue slab of FIG. 2A illustrated along the line B-B, according to some embodiments. Mould 300 defines a monolithic volume that can receive cement-based curable material 302. At least one form insert 304 is configured to extend through the monolithic volume. Pluralities of reinforcing bars 306 and 308 are configured to extend through the monolithic volume in a direction substantially parallel to at least one form insert 304.

A plurality of reinforcing bars 306 is positioned within mould 300 substantially parallel to the bottom of mould 300. A plurality of reinforcing bars 308 is positioned within mould 300 above and substantially parallel to plurality of reinforcing bars 306. Form inserts 304 are positioned substantially parallel to and between the planes of pluralities 306 and 308.

In some embodiments, at least one form insert 304 is positioned in mould 300 with at least one support 310. In some embodiments, at least one support 310 comprises at least one chair. These chairs can hold at least one form inserts 304 in its position while cement-based curable material 302 cures. In some embodiments, these chairs are positioned within cement-based curable material 302. In some embodiments, these chairs are configured to support plurality of reinforcing bars 306 or 308 with support members 313 which may extend from support 310 to position reinforcing bars 306 or 308 at desired positions within mould 300.

In some embodiments, at least one form insert 304 comprises a rigid structure having a generally cylindrical shape that defines an interface between the at least one insert and the cement-based curable material. The frontal cross-section of at least one form insert 304 can be generally square or circular. At least one form insert 304 can be configured to extend in the transverse direction.

Figure 4:
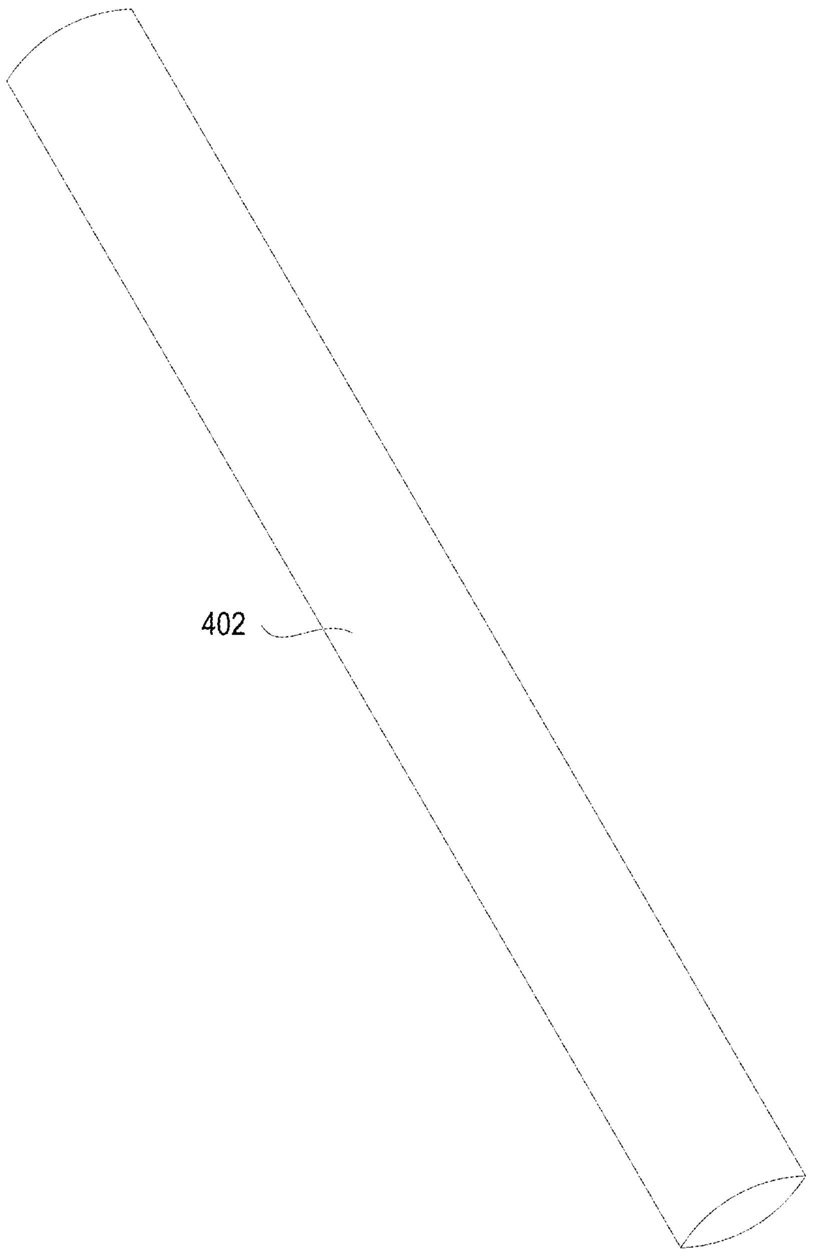
FIG. 4 is an example solid form insert, according to some embodiments.

FIG. 4 is an example solid form insert, according to some embodiments. According to some embodiments, solid form insert 402 can be positioned within a mould defining a monolithic volume. A cement-based curable material can be received by the monolithic volume, in some cases submerging solid form insert 402. Solid form insert 402 can be supported by a support within the monolithic volume while the cement-based curable material cures forming a hollow core or hollow core analogue slab.

In some embodiments, solid form insert 402 comprises Styrofoam, cardboard, wax, paper, plastic, hemp sock, Tyvec, polyurethane, rubber, wood, or PVC. In some embodiments, solid form insert 402 comprises recycled materials. The use of recycled materials can utilize large amounts of material that might otherwise be wasted. In some embodiments where solid form insert 402 is not removed after the cement-based curable material has cured, solid form insert 402 comprises materials that can enhance the insulation of a finished slab.

In some embodiments, solid form insert 402 can be used in the fabrication of hollow core analogue slabs by leaving solid form insert 402 in the slab after the cement-based curable material is poured and left to cure. In these embodiments, solid form insert 402 is less dense than the cured cement-based curable material.

As illustrated, in some embodiments, solid form insert 402 can have a rigid structure with a generally cylindrical shape. In other embodiments, solid form insert 402 can have a generally square shape, according to the frontal cross-section, that extends in the transverse direction.

In some embodiments, solid form insert 402 can be used in the fabrication of hollow core slabs by positioning at least one solid form insert 402 in a monolithic volume into which a cement-based curable material is poured and cured. In these embodiments, at least one solid form insert 402 can be removed once the cement-based curable material has cured leaving behind at least one hollow core in the slab. In some embodiments, solid form insert 402 can be collapsed. In some embodiments, solid form insert 402 can be reused in the manufacture of subsequent hollow core slabs.

Figure 5:
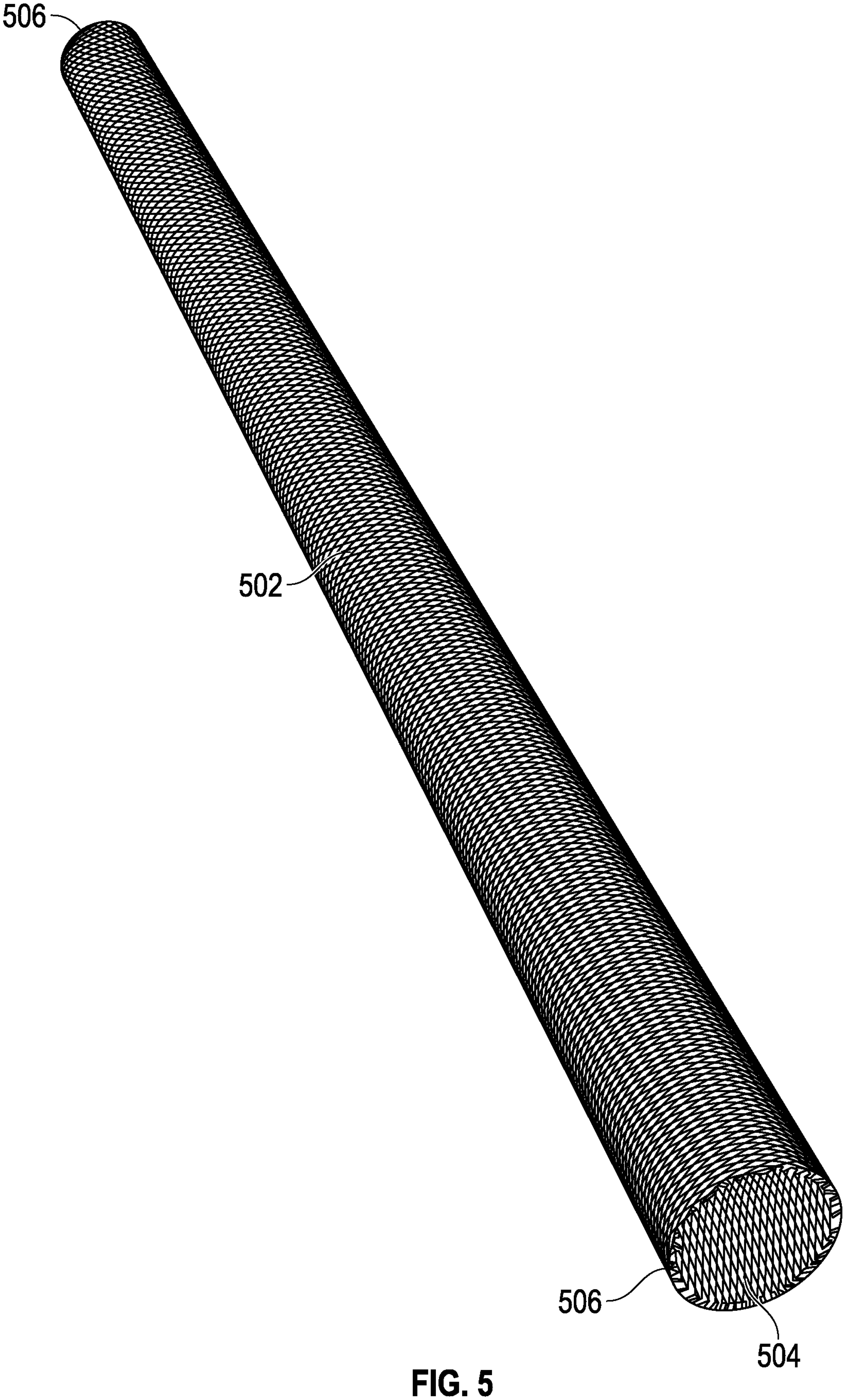
FIG. 5 is another example of a hollow form insert, according to some embodiments.

FIG. 5 is another example of a hollow form insert, according to some embodiments. Hollow form insert 502 comprises a material defining the interface between a cement-based curable material and hollow form insert 502, cavity 504, and at least one end 506. According to some embodiments, hollow form insert 502 can be positioned within a mould defining a monolithic volume. A cement-based curable material can be received by the monolithic volume, in some cases submerge hollow form insert 502. Hollow form insert 502 can be supported by a support within the monolithic volume while the cement-based curable material cures forming a hollow core or hollow core analogue slab.

Hollow form insert 502 can have a rigid structure with a generally cylindrical shape that defines an interface between hollow form insert 502 and the cement-based curable material. In some embodiments, hollow form insert 502 can have a generally square shape, according to the frontal cross-section, that extends in the transverse direction. The interior of hollow form insert 502 comprises cavity 504.

In some embodiments, cavity 504 can minimize the material needed to fabricate hollow form insert 502. This can allow hollow form insert 502 to be fabricated from denser materials than could be chosen with a solid form insert, while still minimizing the density of the form insert.

In some embodiments, hollow form insert 502 comprises Styrofoam, cardboard, wax, paper, plastic, hemp sock, Tyvec, polyurethane, rubber, wood, or PVC. In some embodiments, hollow form insert 502 comprises recycled materials. The use of recycled materials can utilize large amounts of material that might otherwise be wasted. In some embodiments, cavity 504 can be filled with a fluid.

In some embodiments, hollow form insert 502 can be removed once the cement-based curable material has cured leaving behind a hollow core in the slab. In some embodiments, hollow form insert 502 can be collapsed. In some embodiments, hollow form insert 502 can be reused in the manufacture of subsequent hollow core slabs.

In some embodiments, hollow form insert 502 is configured to extend all the way through a mould such that the cement-based curable material cannot enter through an opening in at least one end 506. In other embodiments, at least one end 506 is capped to prevent cement-based curable material ingress.

Figure 6:
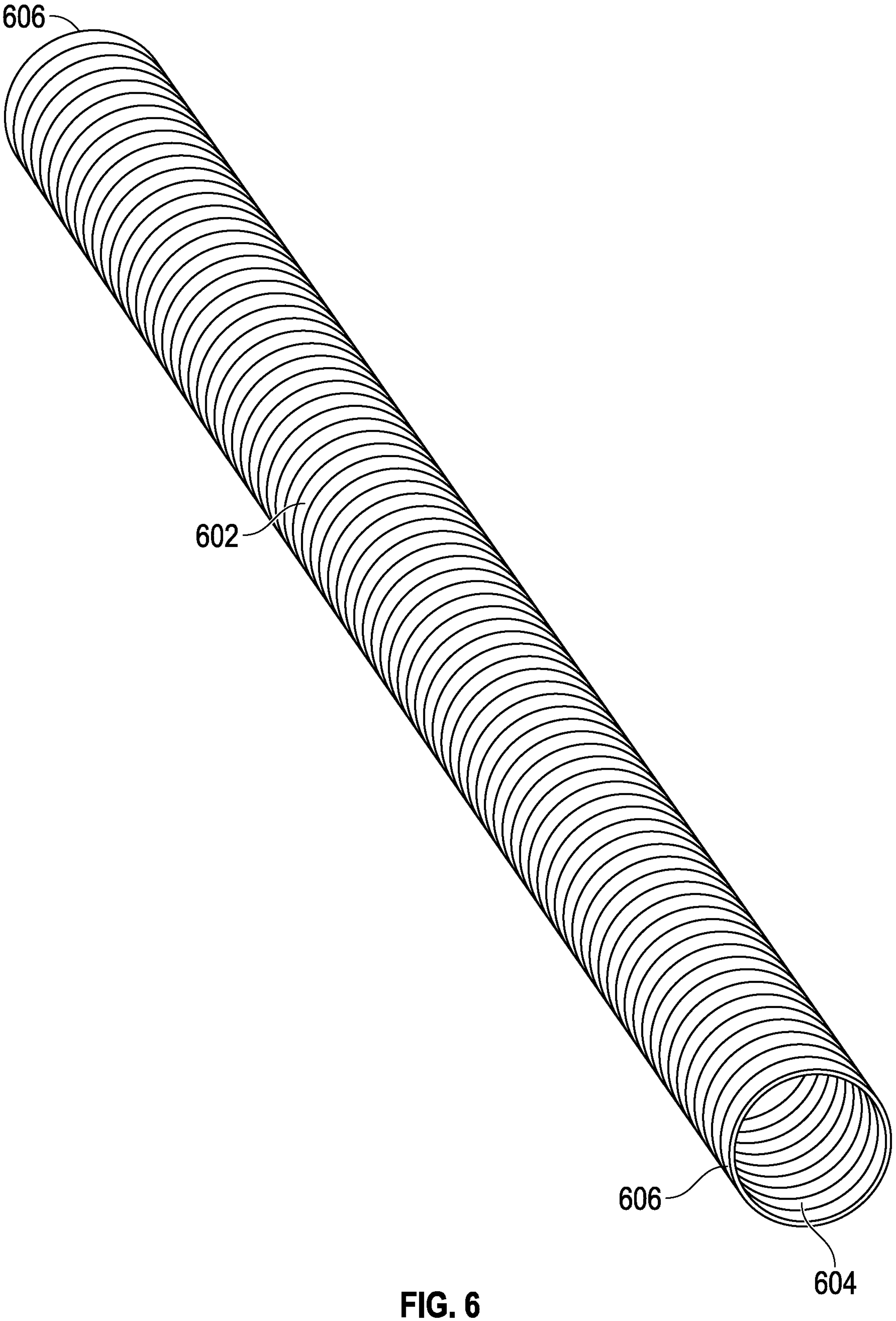
FIG. 6 is another example of a hollow form insert, according to some embodiments.

FIG. 6 is another example of a hollow form insert, according to some embodiments. Hollow form insert 602 comprises a material defining the interface between a cement-based curable material and hollow form insert 602, cavity 604, and at least one end 606. This figure shows another embodiment of the hollow form insert embodiment shown in FIG. 5.

Figure 7:
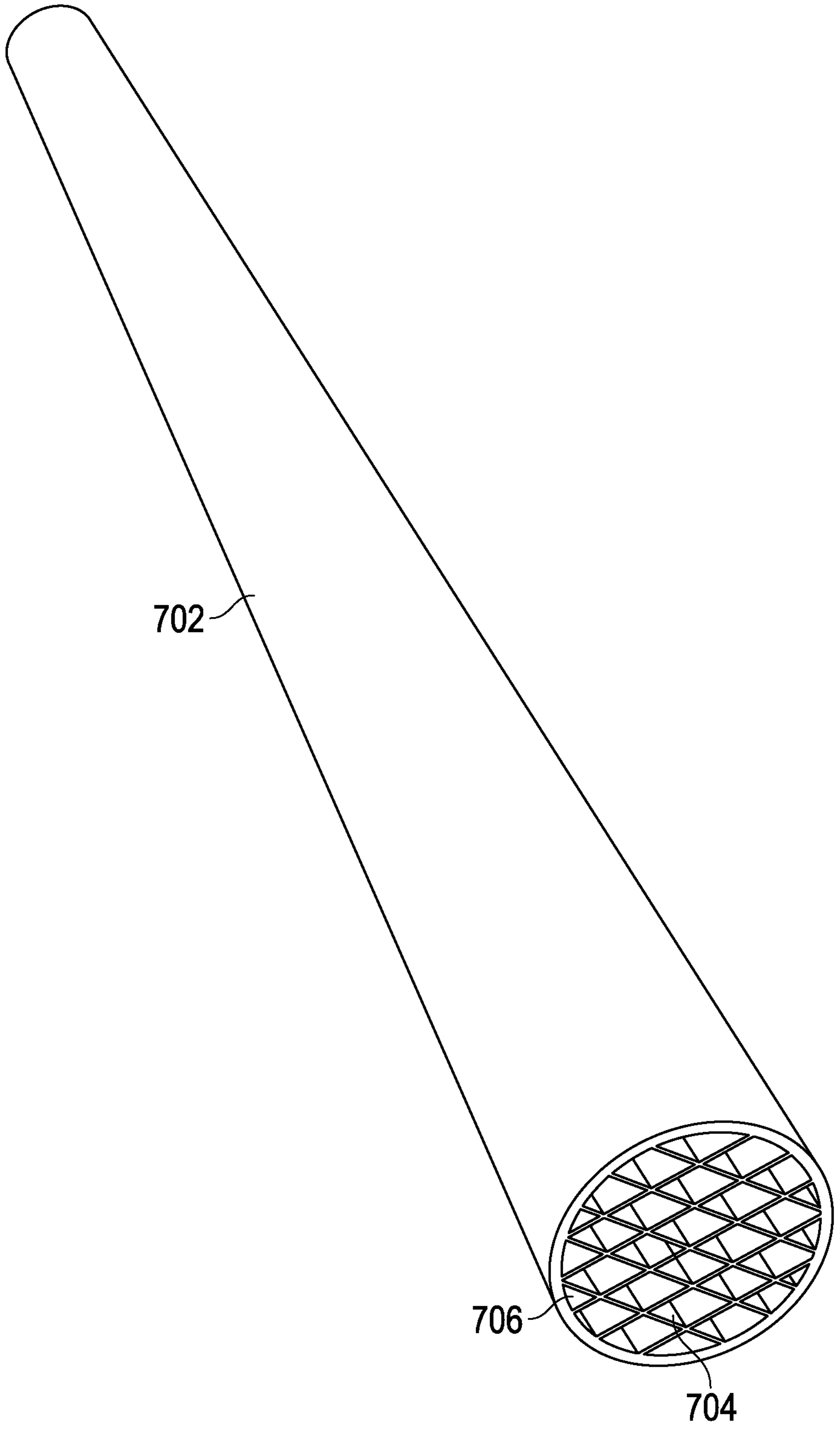
FIG. 7 is another example of a hollow form insert with interior supports, according to some embodiments.

FIG. 7 is another example of a hollow form insert with interior supports, according to some embodiments. Hollow form insert 702 comprises a material defining the interface between a cement-based curable material and hollow form insert 702, cavity 704, and interior supports 706. Hollow form insert 702 can have a rigid structure having a generally cylindrical shape that defines an interface between hollow form insert 702 and the cement-based curable material. In some embodiments, hollow form insert 702 can have a generally square shape, according to the frontal cross-section, that extends in the transverse direction. According to some aspects, hollow form insert 702 can be positioned within a mould defining a monolithic volume. A cement-based curable material can be received by the monolithic volume, in some cases submerging solid form insert 702. Hollow form insert 702 can be supported by a support within the monolithic volume while the cement-based curable material cures forming a hollow core or hollow core analogue slab.

In some embodiments, cavity 704 can minimize the material needed to fabricate hollow form insert 702. This can allow hollow form insert 702 to be fabricated from denser materials than could be chosen with a solid form insert, while still minimizing the density of the form insert. In some embodiments, interior supports 706 can permit hollow form insert 702 to withstand the pressure exerted by a cement-based curable material while it cures even when the materials used to fabricate hollow form insert 702 would not be capable of withstanding said pressure without interior supports 706.

In some embodiments, hollow form insert 702 comprises Styrofoam, cardboard, wax, paper, plastic, hemp sock, Tyvec, polyurethane, rubber, wood, or PVC. In some embodiments, interior supports 706 can comprise materials different than those comprising the hollow form insert 702. In some embodiments, hollow form insert 702 comprises recycled materials. In some embodiments, interior supports 706 comprise recycled materials. The use of recycled materials can utilize large amounts of material that might otherwise be wasted.

In some embodiments, hollow form insert 702 can be removed once the cement-based curable material has cured leaving behind a hollow core in the slab. In some embodiments, hollow form insert 702 can be collapsed. In some embodiments, hollow form insert 702 can be reused in the manufacture of subsequent hollow core slabs.

Figure 8:
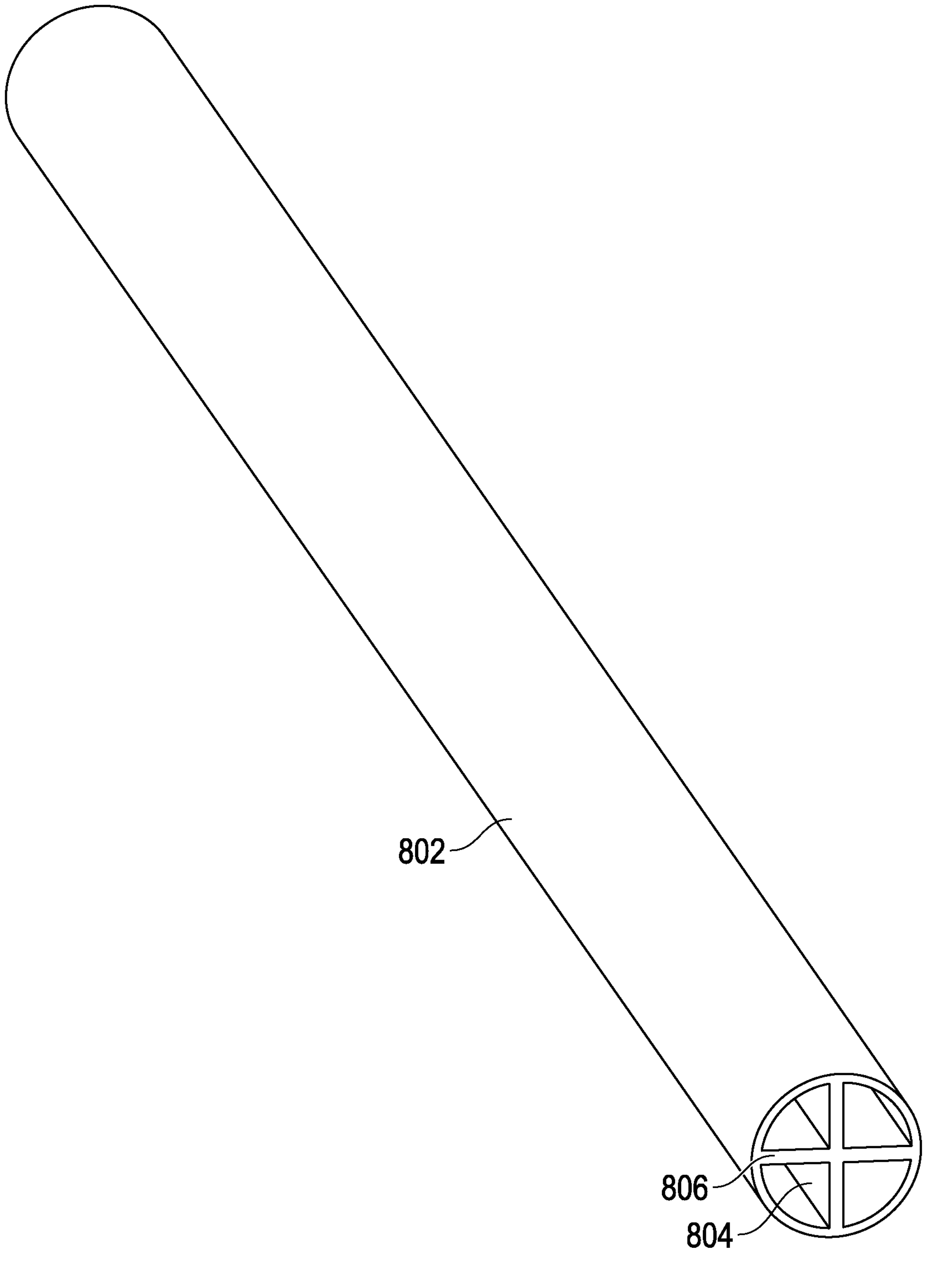
FIG. 8 is another example of a hollow form insert with interior supports, according to some embodiments.

FIG. 8 is another example of a hollow form insert with interior supports, according to some embodiments. Hollow form insert 802 comprises a material defining the interface between a cement-based curable material and hollow form insert 802, cavity 804, and interior supports 806. This figure illustrates another embodiment of the hollow form insert with interior supports shown in FIG. 7.

Figure 9:
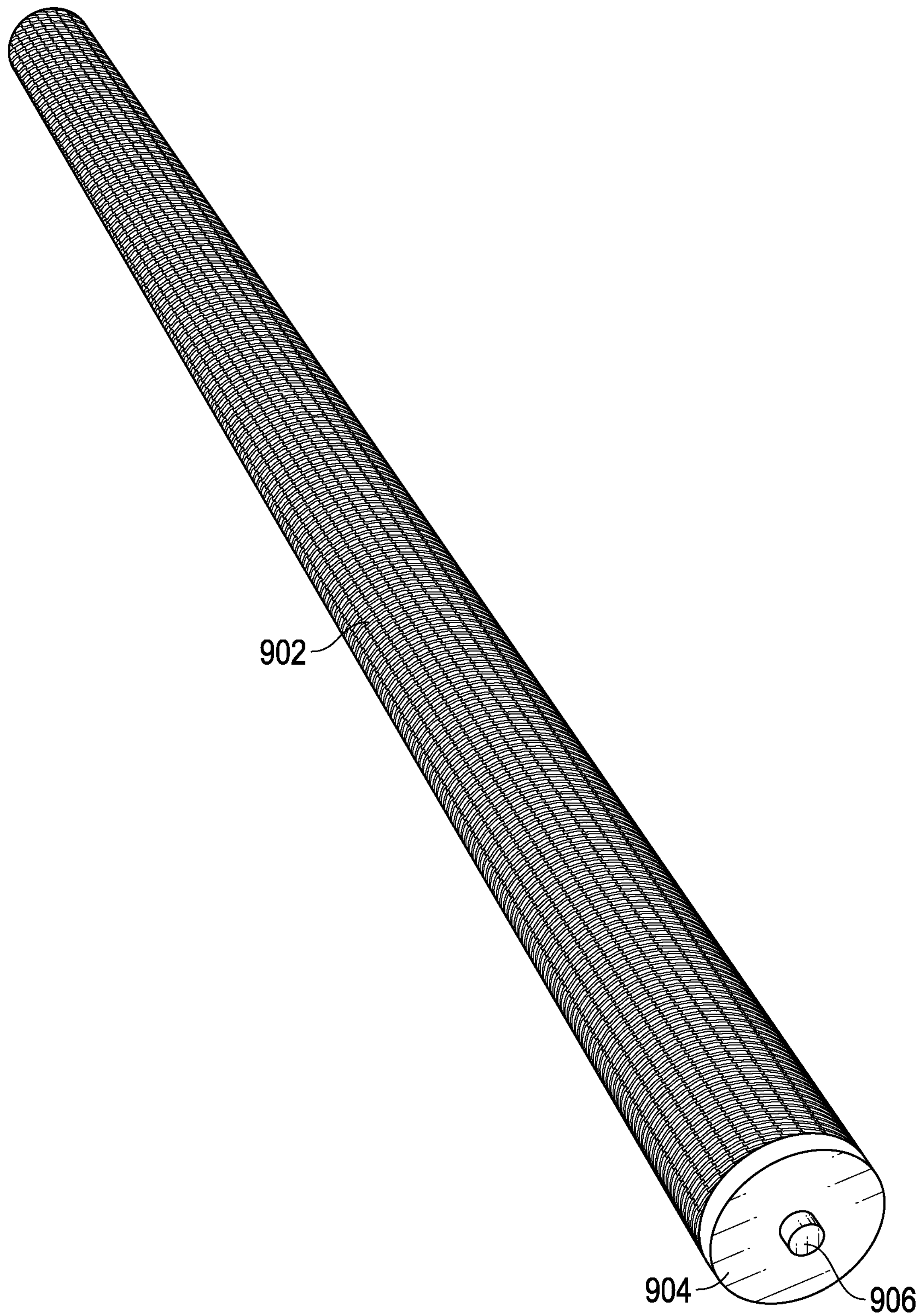
FIG. 9 is an example inflatable form insert, according to some embodiments.

FIG. 9 is an example inflatable form insert, according to some embodiments. Inflatable form insert 902 comprises a resilient inflatable material having a rigid structure when inflated and a generally cylindrical shape that defines an interface between inflatable form insert 902 and the cement-based curable material, end cap 904, and valve 906. End cap 904 prevents a fluid filling inflatable form insert 902 from escaping. Said fluid can be introduced and extracted through valve 906.

Inflatable form insert 902 can be used to manufacture hollow core slabs by positioning inflated inflatable insert 902 in a monolithic volume defined by a mould. Cement-based curable material can be poured into said monolithic volume and allowed to cure. Once the cement-based curable material has cured, inflatable form insert 902 can be deflated and removed from the slab, leaving a hollow core in the slab. In some embodiments, inflatable form insert 902 can be reused to manufacture subsequent hollow core slabs.

In some embodiments, inflatable form insert 902 comprises plastic, hemp sock, Tyvec, polyurethane, or rubber. In some embodiments, inflatable form insert 902 comprises recycled materials. The use of recycled materials can utilize large amounts of material that might otherwise be wasted. In some embodiments, the fluid used to inflate form insert 902 is a gas, in others a liquid.

Figure 10:
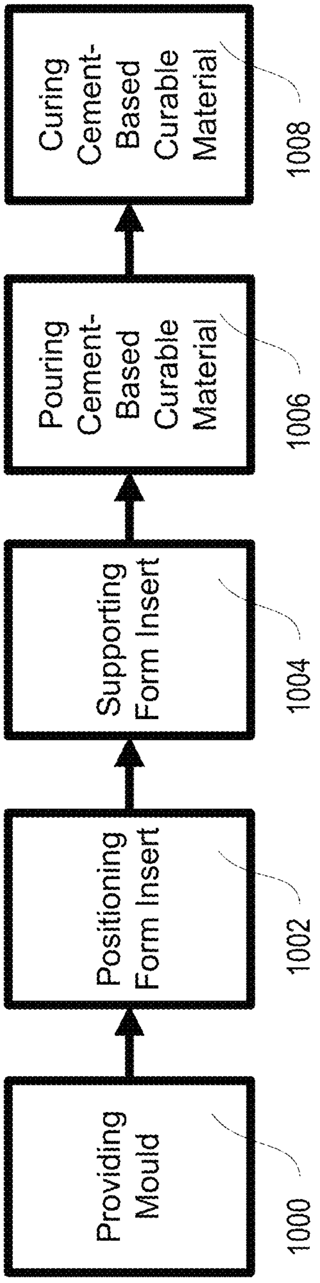
FIG. 10 is a schematic diagram of a method to manufacture a hollow core or hollow core analogue slabs, according to some embodiments.

FIG. 10 is a schematic diagram of a method to manufacture a hollow core or hollow core analogue slabs, according to some embodiments. More specifically, FIG. 10 illustrates the steps involved in a method of manufacturing a hollow core or hollow core analogue slab in-situ comprising: providing a mould to receive at least one form insert, the mould defining a monolithic volume, and the mould positioned at an in-situ desired location of the hollow core or hollow core analogue slab (1000), positioning the at least one form insert within the monolithic volume (1002), supporting the at least one form insert in a fixed position within the monolithic volume (1004), pouring a cement-based curable material to fill the monolithic volume (1006), and curing the cement-based curable material (1008).

In some embodiments, the at least one form insert described in step 1002 comprises a rigid structure having a generally cylindrical shape that defines an interface between the at least one form insert and the cement-based curable material. In some embodiments, the at least one form insert comprises a generally square shape, according to the frontal cross-section, that extends in the transverse direction. In some embodiments, the at least one form insert is made with Styrofoam, cardboard, wax, paper, plastic, hemp sock, Tyvec, polyurethane, rubber, wood, or PVC. In some embodiments, the at least one form insert comprises recycled materials. The use of recycled materials can utilize large amounts of material that might otherwise be wasted. In some embodiments, a support, e.g. a chair, supports the at least one form insert in a fixed position within the monolithic volume.

Figure 11:
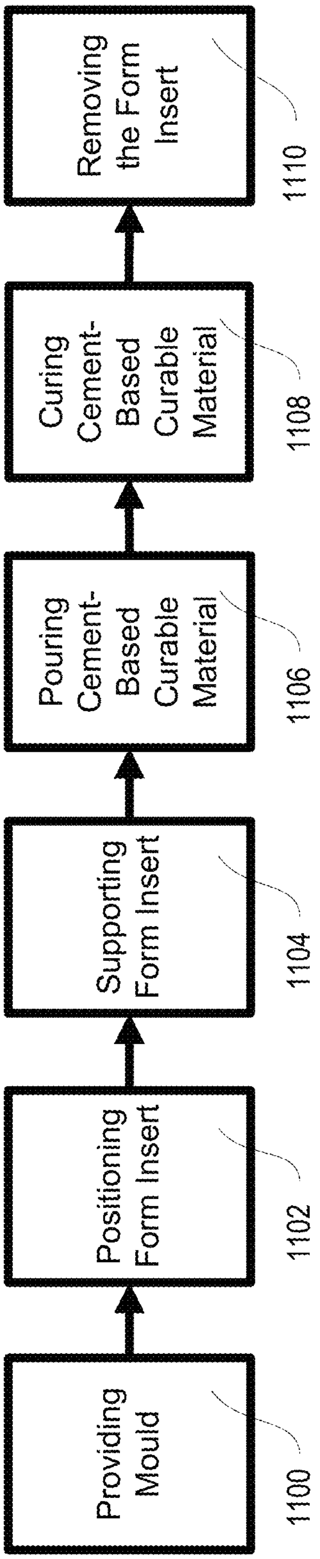
FIG. 11 is a schematic diagram of a method to manufacture a hollow core or hollow core analogue slabs comprising removing form inserts, according to some embodiments.

FIG. 11 is a schematic diagram of a method to manufacture a hollow core or hollow core analogue slabs comprising removing form inserts, according to some embodiments. More specifically, FIG. 11 illustrates the steps involved in a method of manufacturing a hollow core or hollow core analogue slab in-situ comprising: providing a mould to receive at least one form insert, the mould defining a monolithic volume, and the mould positioned at an in-situ desired location of the hollow core or hollow core analogue slab (1100), positioning the at least one form insert within the monolithic volume (1102), supporting the at least one form insert in a fixed position within the monolithic volume (1104), pouring a cement-based curable material to fill the monolithic volume (1106), curing the cement-based curable material (1108), removing the at least one form insert from the cement-based curable material when said cement-based curable material has cured (1110). In some embodiments, a support, e.g. a chair, supports the at least one form insert in a fixed position within the monolithic volume.

Figure 12:
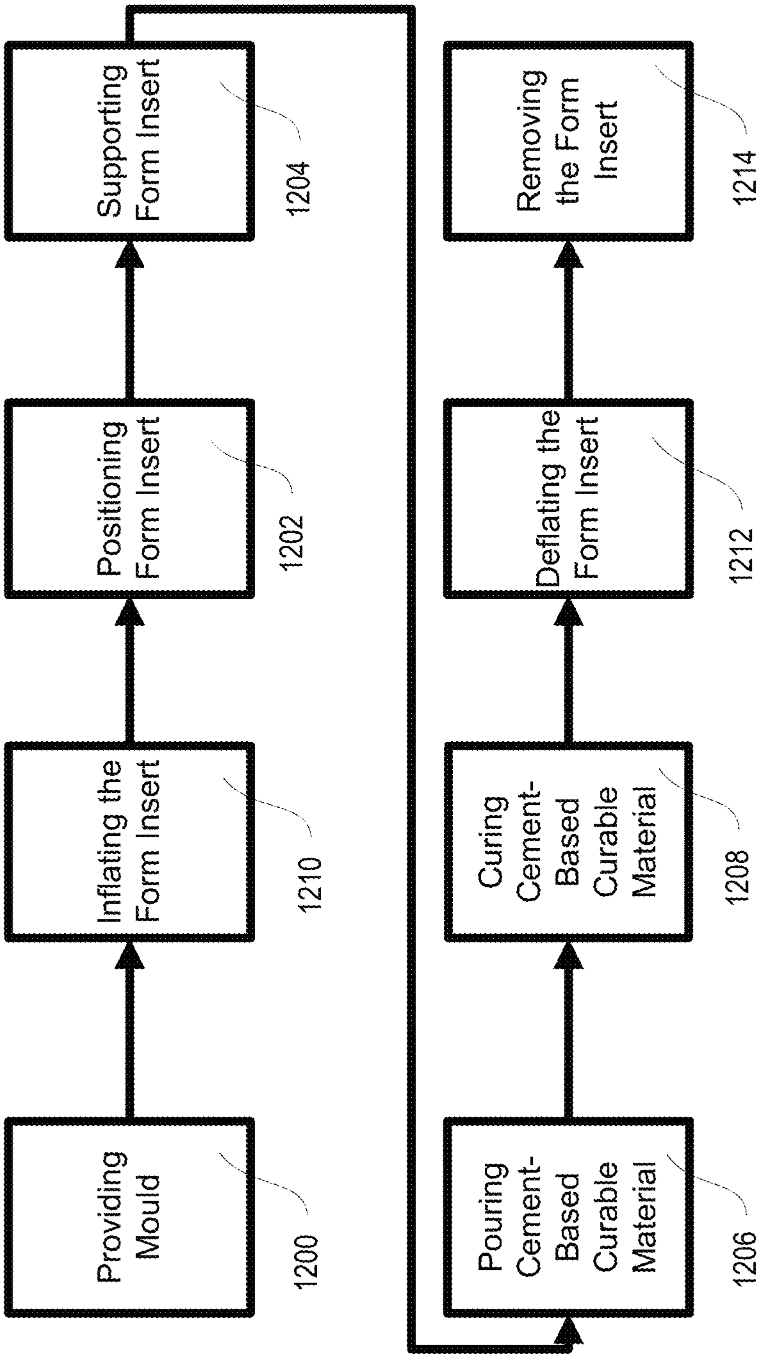
FIG. 12 is a schematic diagram of a method to manufacture a hollow core or hollow core analogue slabs wherein an inflatable form insert is used, according to some embodiments.

FIG. 12 is a schematic diagram of a method to manufacture a hollow core or hollow core analogue slabs wherein an inflatable form insert is used, according to some embodiments. More specifically, FIG. 12 illustrates the steps involved in a method of manufacturing a hollow core or hollow core analogue slab in-situ comprising: providing a mould to receive at least one form insert, the mould defining a monolithic volume, and the mould positioned at an in-situ desired location of the hollow core or hollow core analogue slab (1200), inflating the at least one form insert (1210), positioning the at least one form insert within the monolithic volume (1202), supporting the at least one form insert in a fixed position within the monolithic volume (1204), pouring a cement-based curable material to fill the monolithic volume (1206), curing the cement-based curable material (1208), deflating the at least one form insert (1212), and removing the at least one form insert (1214). In some embodiments, a support, e.g. a chair, supports the at least one form insert in a fixed position within the monolithic volume.

In some embodiments, the at least one form insert described in step 1210 comprises a resilient inflatable material and a rigid structure when inflated having a generally cylindrical shape that defines an interface between the at least one insert and the cement-based curable material. In some embodiments, the at least one form insert described in step 1210 comprises a generally square shape, according to its frontal cross-section, that extends in the transverse direction. In some embodiments, a support, e.g. a chair, supports the at least one form insert in a fixed position within the monolithic volume.

Figure 13:
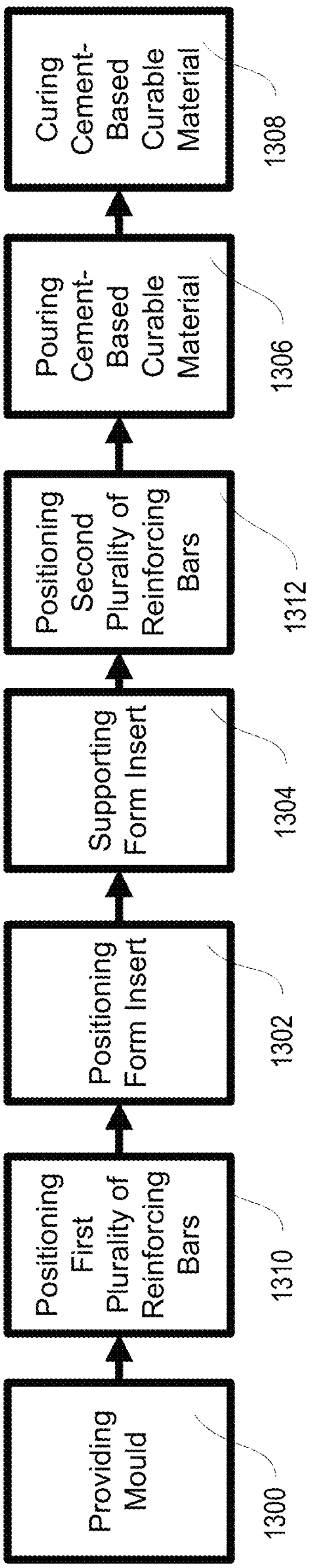
FIG. 13 is a schematic diagram of a method to manufacture a hollow core or hollow core analogue slabs wherein reinforcing bars are used, according to some embodiments.

FIG. 13 is a schematic diagram of a method to manufacture a hollow core or hollow core analogue slabs wherein reinforcing bars are used, according to some embodiments. More specifically FIG. 13 illustrates the steps involved in a method of manufacturing a hollow core or hollow core analogue slab in-situ comprising: providing a mould to receive at least one form insert, the mould defining a monolithic volume, and the mould positioned at an in-situ desired location of the hollow core or hollow core analogue slab (1300), positioning a first plurality of reinforcing bars to extend through the monolithic volume along a plane substantially parallel to the bottom of the mould (1310), positioning the at least one form insert within the monolithic volume (1302), supporting the at least one form insert in a fixed position within the monolithic volume (1304), positioning a second plurality of reinforcing bars to extend through the monolithic volume along a plane substantially parallel to and above the first plurality of reinforcing bars (1312), pouring a cement-based curable material to fill the monolithic volume (1306), and curing the cement-based curable material (1308). In some embodiments, a support, e.g. a chair, supports the at least one form insert in a fixed position within the monolithic volume.

In some embodiments, positioning of the first or second plurality of reinforcing bars described by steps 1310 and 1312 configures the first or second plurality of reinforcing bars to extend in a direction substantially orthogonal to the at least one form insert. In some embodiments, positioning of the first or second plurality of reinforcing bars described by steps 1310 and 1312 configures the first or second plurality of reinforcing bars to extend in a direction substantially parallel to the at least one form insert. In some embodiments, positioning of the first or second plurality of reinforcing bars described by steps 1310 and 1312 configures the first or second plurality of reinforcing bars to include some bars that extend in a direction substantially orthogonal to the at least one form insert and some that extend in a direction substantially parallel to the at least one form insert. In some embodiments, positioning the at least one form insert described in step 1302 configured the at least one form insert to extend along a plane between the planes of the first and second pluralities of reinforcing bars positioned in steps 1310 and 1312. In some embodiments, a support, e.g. a chair, supports the first or second plurality of reinforcing bars in a fixed position within the monolithic volume.

All methods in FIG. 10 to FIG. 13 are variant embodiments of one another. As such, any modifications to a step present in one embodiment is applicable to another embodiment to the extent that that other embodiment contains the same step.

Walls and columns illustrated in FIGS. 10 and 1D may be created with any one of the methods described above, and then rotating the hollow core or hollow core analogue slab for positioning as a wall or column. In an example, a hollow core of a hollow core wall or column may be used to run piping, wiring, ventilation conduits, or other structural elements of a building.

The Applicant notes that the described embodiments and examples are illustrative and non-limiting. Practical implementation of the features may incorporate a combination of some or all of the aspects, and features described herein should not be taken as indications of future or existing product plans. The Applicant partakes in both foundational and applied research, and in some cases, the features described are developed on an exploratory basis.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods, and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

As can be seen therefore, the examples described above and illustrated are intended to be exemplary only. The scope is indicated by the appended claims.

What is claimed is:

1. A method of manufacturing a hollow core analogue slab using a plurality of form inserts, the method comprising:

positioning the plurality of form inserts in a monolithic volume defined by the final intended position of the hollow core analogue slab and further comprising structural features of a building, the monolithic volume having a first dimension and a second dimension orthogonal to the first dimension, wherein each form insert extends a first distance of the monolithic volume in the first dimension and extends a second distance of the monolithic volume in the second dimension, wherein the first distance is greater than the second distance, wherein the plurality of form inserts are positioned spaced apart along the second dimension of the monolithic volume, wherein the plurality of form inserts are positioned above a bottom edge of the monolithic volume;

pouring a cement-based curable material into the monolithic volume to submerge the plurality of form inserts, wherein a portion of the cement-based curable material fills a space defined between the bottom edge of the monolithic volume and the plurality of form inserts; and curing the cement-based curable material around the plurality of form inserts, wherein each of the plurality of form inserts are less dense than the cured cement-based curable material to form the hollow core analogue slab, and wherein the plurality of form inserts remain embedded within the cement-based curable material after the cement-based curable material is cured.

2. The method of claim 1 wherein at least one of the plurality of form inserts is positioned in the monolithic volume with at least one support.

3. The method of claim 2 wherein the at least one support is at least one chair.

4. The method of claim 1 wherein the plurality of form inserts each comprise a rigid structure having a generally cylindrical shape that defines an interface between the at least one insert and the cement-based curable material.

5. A method of manufacturing a hollow core analogue slab in-situ comprising:

providing a monolithic volume to receive plurality of form inserts, the monolithic volume defining an in-situ desired location of the hollow core analogue slab and further comprising structural features of a building, the monolithic volume having a first dimension and a second dimension orthogonal to the first dimension;

positioning the plurality of form inserts within the monolithic volume and above a bottom edge of the monolithic volume, wherein each form insert extends a first distance of the monolithic volume in the first dimension and extends a second distance of the monolithic volume in the second dimension, wherein the first distance is greater than the second distance, wherein the plurality of form inserts are positioned spaced apart along the second dimension of the monolithic volume;

supporting the plurality of form inserts in a fixed position within the monolithic volume;

pouring a cement-based curable material to fill the monolithic volume to submerge the plurality of form inserts, wherein a portion of the cement-based curable material fills a space between the bottom edge of the monolithic volume and the plurality of form inserts; and curing the cement-based curable material around the plurality of form inserts, wherein each of the plurality of form inserts are less dense than the cured cement-based curable material to form the hollow core analogue slab, and wherein the plurality of form inserts remain embedded within the cement-based curable material after the cement-based curable material is cured.

6. The method of claim 5 wherein the plurality of form inserts each comprise a rigid structure having a generally cylindrical shape that defines an interface between the insert and the cement-based curable material.

7. The method of claim 5 comprising:

before pouring the cement-based curable material, positioning a first plurality of reinforcing bars to extend through the monolithic volume along a plane substantially parallel to the bottom of the monolithic volume; and positioning a second plurality of reinforcing bars to extend through the monolithic volume along a plane substantially parallel to and above the first plurality of reinforcing bars.

8. The method of claim 7 comprising:

positioning the first or second plurality of reinforcing bars to extend in a direction substantially parallel to the at least one form insert.

9. The method of claim 7 comprising:

positioning the plurality of form inserts to extend along a plane between the planes of the first and second plurality of reinforcing bars.

10. The method of claim 1, wherein at least one of the plurality of form inserts is made with polystyrene foam, cardboard, wax, paper, plastic, hemp sock, synthetic flashspun high-density polyethylene fibers, polyurethane, rubber, wood, PVC, or a resilient inflated material.

11. The method of claim 1, wherein at least one of the plurality of form inserts comprises recycled materials.

12. The method of claim 11, wherein the recycled materials comprise recycled polystyrene foam.

13. The method of claim 5, wherein at least one of the plurality of form inserts is made with polystyrene foam, cardboard, wax, paper, plastic, hemp sock, synthetic flashspun high-density polyethylene fibers, polyurethane, rubber, wood, PVC, or a resilient inflated material.

14. The method of claim 5, wherein at least one of the plurality of form inserts comprises recycled materials.

15. The method of claim 14, wherein the recycled materials comprise recycled polystyrene foam.

16. The method of claim 1, wherein the first dimension of the monolithic volume comprises a width of the monolithic volume and the first distance of each form insert is equal to the width of the monolithic volume.

17. The method of claim 5, wherein the first dimension of the monolithic volume comprises a width of the monolithic volume and the first distance of each form insert is equal to the width of the monolithic volume.

* * * * *